United States Patent [19]

Patel

[11] Patent Number: 5,313,323

[45] Date of Patent: May 17, 1994

[54] FIBER OPTIC BUS AND TAG ADAPTER FOR BLOCK MULTIPLEXER CHANNEL

[75] Inventor: Narottam N. Patel, New Brighton, Minn.

[73] Assignee: Unisys Corporation, Roseville, Minn.

[21] Appl. No.: 912,972

[22] Filed: Jul. 10, 1992

[51] Int. Cl.$^5$ .............................. H04J 14/00
[52] U.S. Cl. ................... 359/115; 359/152; 359/173; 359/179
[58] Field of Search ............. 359/113, 115, 118, 143, 359/152, 163, 165, 173, 176, 179; 364/713

[56] References Cited

U.S. PATENT DOCUMENTS

| | | | |
|---|---|---|---|
| 4,554,673 | 11/1985 | Stevens | 359/118 |
| 4,654,844 | 3/1987 | Mandello | 359/113 |
| 5,099,346 | 3/1992 | Lee et al. | 359/143 |

OTHER PUBLICATIONS

"A Microprocessor Monitored Fibre Optic Data Link", J. Instn Electronics & Telecom. Engrs, vol. 27, No. 7, 1981.

Primary Examiner—Leslie Pascal
Assistant Examiner—K. Negash
Attorney, Agent, or Firm—John L. Rooney

[57] ABSTRACT

An apparatus and method for transferring input/output information between a host computer and a peripheral device via fiber optic medium using the existing standard protocol designed to employ parallel electrical transmissions. In this manner, all of the advantages of fiber optic transmission, including EMI protection, lower power dissipation, small serial fiber optic cables, etc., are achieved without the need to modify any other system hardware or software elements. In the preferred mode, the Block Multiplexer Channel standard interface is modified for fiber optic transmission of both bus and tag information.

17 Claims, 19 Drawing Sheets

FIBER OPTIC BUS AND TAG ADAPTER FOR BLOCK MULTIPLEXER CHANNEL

BACKGROUND OF THE INVENTION

1. Field of the Invention

The present invention generally relates to transfers of data between host computers and peripheral devices and more particularly relates to such transfers which utilize a fiber optic transmission medium.

2. Description of the Prior Art

It has been known for some time to transfer digital data between peripheral equipments and host computers. The earliest and most popular medium for such transfers is electrical energy, which flows within a circuit including portions of the host computer, peripheral devices, and interconnecting electrical cables. These data transfers may be serial in nature, which transmit one data bit at a time, or parallel, in which a number of data bits are transmitted simultaneously.

For a given switching speed of an individual electrical circuit, the parallel approach is inherently faster because it transfers multiple data bits simultaneously. This has meant that serial transmissions have tended to be limited to low data rate information paths or to long distances wherein the cost for parallel transmission is prohibitively expensive. Therefore, most modern day data transfers between host computers and associated peripheral devices utilize parallel electrical transmission. A typical protocol for such transmissions is the popular Block Multiplexer Channel (i.e. BMC) utilized by Unisys Corporation. This highly efficient approach transfers data as parallel bytes (along with error detection bits) over a first parallel cable and control signals over a second parallel cable. Because these two cables transfer data and control signals only in one direction, a second pair of cables is usually needed for transfers in the opposite direction. The technique provides an effective transfer rate in each direction of nearly 4.5 MB/sec.

A second medium which is gaining popularity for data transmission is fiber optics. In this approach, the digital data is converted to pulses of light which are transferred over a special light conducting fiber optic cable. Because this transmission medium does not experience the same distributed capacitance which delays electrical transmissions, higher data rates can generally be achieved for a given transmission energy. In fact the data transmission rates tend to be sufficiently high, that serial fiber optic transmissions can be utilized to replace parallel electrical transmissions for many host computer to peripheral device transfers.

However, the conversion of historically parallel electrical transmission paths to newer serial fiber optic transmission paths tends to result in the use of protocols which are different and incompatible with the older parallel systems utilizing the electrical medium. These incompatibilities result from the basic differences in the media, conversion from parallel to serial transmission, and different methods of generating and using control signals. In most cases this means that the advantages of fiber optic transmission tend to be limited to systems which are newly designed around these unique requirements.

For some applications, it is desirable to retrofit existing systems with fiber optic transmission for one or more data links between host computer and peripheral devices. The typical manner of providing such a retrofit is to design and fabricate an interface device for both host computer and peripheral device ends of the transmission path. A general characteristic of such interface devices is that they contain sufficient memory to buffer a complete transmission or logical portion thereof, to permit ease of conversion from the existing electrical protocol to the new fiber optic protocol.

Functionally, a first parallel data transmission is made to the buffer within the interface device from the parallel electrical transmission link. After the data has been stored in the buffer memory, a second serial transmission is made over the fiber optic medium between the buffer memory of the first interface device and the buffer memory of the second interface device. Yet a third data transmission is made from the buffer memory of the second interface device via a parallel electrical cable to the receiving device (i.e. host computer or peripheral device). This results in three separate transmissions of the same data, each with its own control signals and protocol.

SUMMARY OF THE INVENTION

The present invention overcomes the disadvantages found in the prior art by providing a fiber optic transmission technique suitable for retrofit of systems employing standardized parallel electrical interfaces without change to the existing protocol and without the need to buffer data and/or control signals within an interface buffer.

The advantages of fiber optic transmission are considerable. Replacement of parallel electrical cables with a serial fiber optic cable results in substantial savings in cost, space, weight, power, and complexity. Furthermore, the fiber optic cables neither emit nor are susceptible to electromagnetic interference (EMI). In accordance with the present invention, the electrical to fiber optic interface complexity is greatly reduced and requires no buffering. Therefore, reliability and maintainability are also vastly improved. Yet the use of fiber optics as the transmission medium remains completely transparent to the existing system hardware and software.

In the preferred mode of the present invention, a single serial fiber optic link replaces both the parallel bus or data cable and the parallel tag or control cable of the standardized Unisys Block Multiplexer Channel. The prior art bus cable transfers eight data bits and one parity bit in parallel. Similarly, the prior art tag cable transfers nine or ten control signals in parallel. This means that the preferred mode must transfer up to 18/19 signals over a single fiber optic cable.

The adapter at the transmitting end of the interface utilizes receivers to convert the existing output driver signals into internal logic levels. Eighteen or nineteen such receivers are required. The outputs of the nine bus receivers and the nine or ten tag receivers are wire-ored to produce a single nine or ten bit parallel word. A control circuit alternately enables the bus and tag signals. The single nine or ten bit parallel word is multiplexed to produce a serial data stream containing all eighteen or nineteen bits (i.e. eight data bits, one parity bit, and nine or ten control signals).

The serial data stream is converted from an electrical signal to a light signal by the fiber optic transmitter. This light signal is coupled to a fiber optic cable which may be up to about 500 feet in length. The use of this single fiber optic cable instead of the two parallel electrical cables provides the advantages in space, weight, and cost.

At the receiving end of the fiber optic cable, a fiber optic receiver converts the serial light signal into a serial electrical signal. This signal is demultiplexed into a nine bit parallel word along with a control bit which distinguishes between bus data and tag data. This nine bit parallel word is alternately strobed by the control bit to alternately drive the nine bus drivers and the nine tag drivers. These drivers produce the interface signals anticipated by the existing prior art receivers. The result is an interface having all of the advantages of fiber optic transmission which can be retrofit with complete transparency into an existing prior art system. Yet the interface adapters are highly reliable, easily maintainable, and contain no buffering memory.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
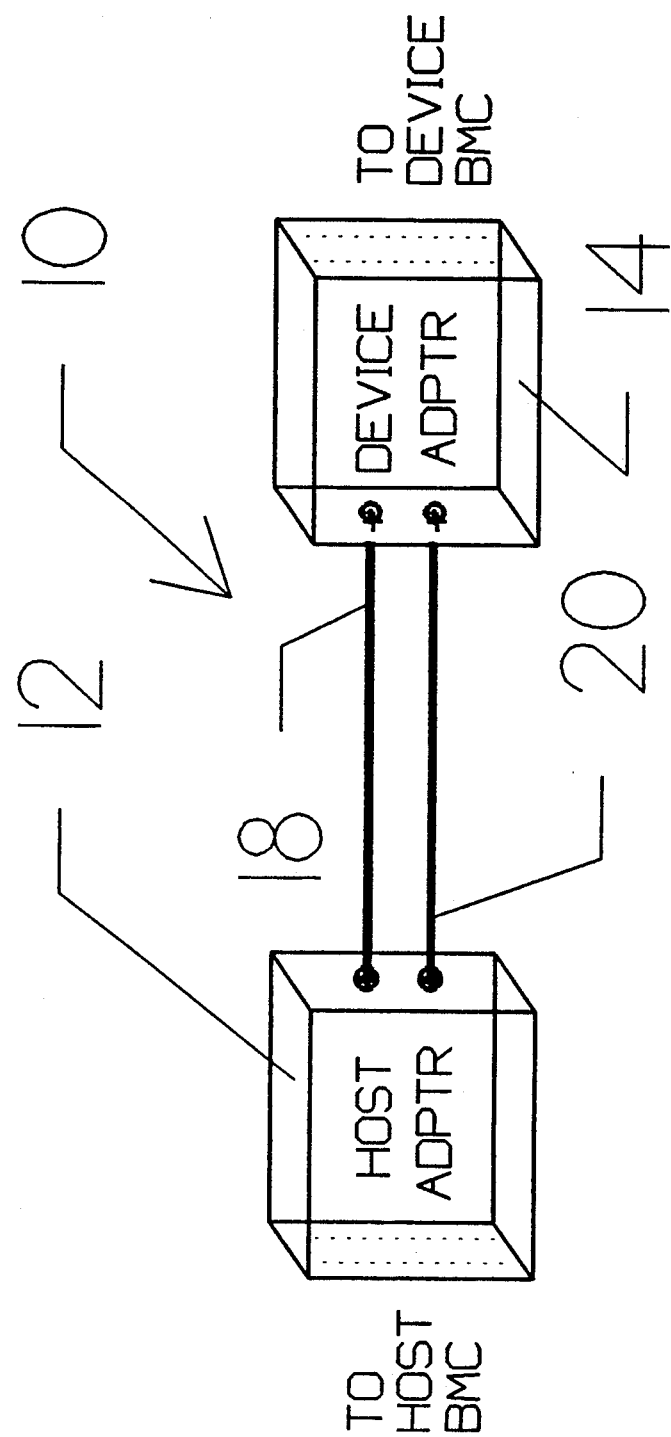
FIG. 1 is a diagram showing the basic mechanical layout of the present invention.

FIG. 1 is a diagram of the basic mechanical layout of fiber optic adapter system 10, employing the preferred mode of the present invention. It consists of host computer interface adapter 12 which is coupled directly to the Block Multiplexer Channel of the host computer (not shown). The definition of this input/output protocol is generally available in the art from Unisys Corporation. The present invention is equally appropriate, without limitation, to other embodiments involving other input/output protocols.

Similarly, peripheral device interface adapter 14 couples directly to the Block Multiplexer Channel of the peripheral device (not shown) involved in the data transfer. All data and control signals transferred from the host computer to the peripheral device are serialized and transferred over the single conductor fiber optic cable 18. Likewise, all data and control signals transferred from the peripheral device to the host computer are sent via single conductor fiber optic cable 20.

As explained in more detail below, all data and control signals are multiplexed into a single bit stream for transfer over fiber optic cables 18 and 20 by host computer interface adapter 12 or peripheral device interface adapter 14. The data and control signals are demultiplexed at the receiving interface adapter (i.e. 12 or 14) for presentation to the existing hardware and software as a standardized Block Multiplexer Channel transfer.

Figure 2:
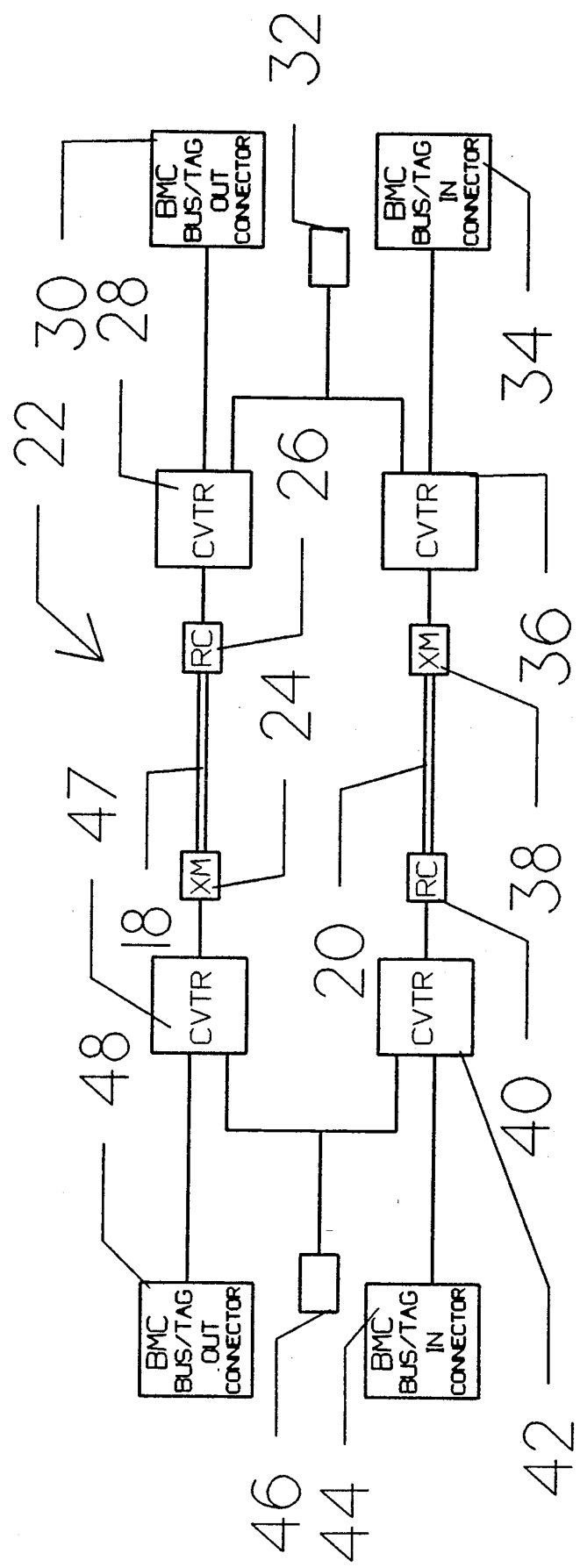
FIG. 2 is a block diagram of the elements of FIG. 1.

FIG. 2 is a basic block diagram 22 of the functions performed by fiber optic adapter system 10. BMC interface 48 provides the electrical interface between the output line drivers of the host computer BMC and the internal logic levels. A separate level conversion circuit is required for each of the nine bus parallel bit positions and each of the ten tag control signals. The parallel bus and tag data words are serialized by converter 47. The multiplexing processes is controlled by timing controller 46.

The single bit data stream containing both bus and tag information is provided to fiber optic transmitter 24 for conversion into a modulated light beam. This modulated light beam is coupled to fiber optic cable 18 for transmission to the peripheral device which may be located up to about 500 feet from the host computer.

The transmitted modulated light beam is received by fiber optic receiver 26 which reconverts it back into an electrical serial bit stream. The serial bit stream is demultiplexed by converter 28 under control of timing controller 32 into the nine bit parallel bus word and the nine bit parallel tag word. These two parallel words are converted by BMC drivers 30 into the input/output levels anticipated by the existing Block Multiplexer Channel input receivers of the peripheral device (not shown).

Transmission of data and control signals from the peripheral device to the host computer BMC is similar functionally but not identical at the circuit level, because of the difference between the host computer control status from that of the peripheral device. The peripheral bus and tag data from the peripheral device are converted to internal logic levels by BMC converter 34. Multiplexing into a single bit serial data stream is accomplished by converter 36 under control of timing controller 32. Fiber optic transmitter 36 modulates a light beam with the bus and tag information and places it on single conductor fiber optic cable 20.

The modulated light beam transmitted along fiber optic cable 20 is converted by fiber optic receiver 40 into an electrical serial bit stream. This serial bit stream is demultiplexed by converter 42 into the nine bit bus data word and the nine bit tag data word. The level of each of these signals is changed by the drivers in BMC drivers 44 to present the host computer BMC (not shown) with a fully compatible Block Multiplexer Channel input.

Figure 3:
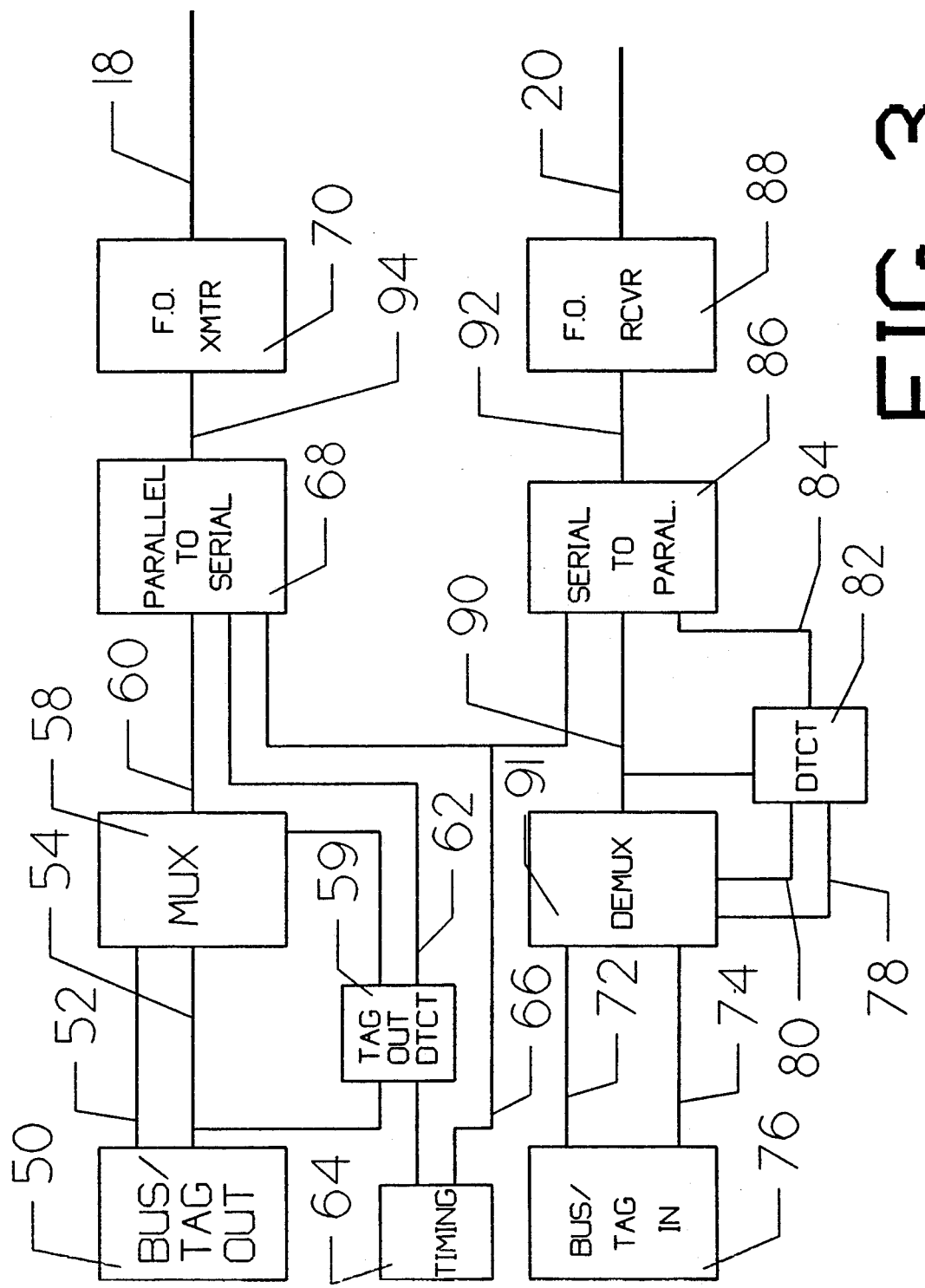
FIG. 3 is a detailed block diagram of the host computer interface.

FIG. 3 is a more detailed block diagram of the circuitry within the host computer BMC interface adapter of the system. Bus/tag output connector 50 contains line receivers for each of the nine parallel bus out data positions and the ten parallel tag out data positions. The nine parallel bus bits are provided to multiplexer 58 via signal lines 52, and the ten parallel tag out bits are provided to multiplexer 58 via cable 54. Timing generator 64 is oscillator controlled and provides multiplexer 58 with output timing. Tag detector 59 provides the frame initiation and synchronization to multiplexer 58 and to parallel to serial converter 68 via line 62.

The output of multiplexer 58 is a single nine/ten bit parallel word which is time division multiplexed between bus and tag data. This single nine bit parallel word is presented to parallel to serial converter 68 by signal lines 60. The output on line 94 is a single bit stream containing both bus and tag data. Fiber optic transmitter 70 uses this single bit stream to modulate a light beam which is coupled to fiber optic cable 18.

The bus and tag data received by the host computer BMC from the peripheral device is received via fiber optic cable 20 as a modulated light beam. Fiber optic receiver 88 converts the modulation on the light beam into an electrical data stream which is sent via line 92 to serial to parallel converter 86. Under control of timing generator 64 via line 66, serial to parallel converter 86 produces a nine bit parallel word sent over signal lines 90 to demultiplexer 91. Detector 82 is coupled to serial to parallel converter 86 via cable 84 to enable it to differentiate between bus and tag information. Control signals are produced by detector 82 which are coupled to demultiplexer 91 via lines 78 and 80.

The output of demultiplexer 91 is a nine bit bus data word transferred to bus/tag input connector 76 via signal lines 72 and a nine bit tag word transferred to bus/tag input connector 76 via signal lines 80. The electrical characteristics of each of the eighteen bits (i.e. nine bus data bits and nine tag in bits) is converted to standard BMC line level by a different one of eighteen line drivers within bus/tag input demultiplexer 91.

Figure 4:
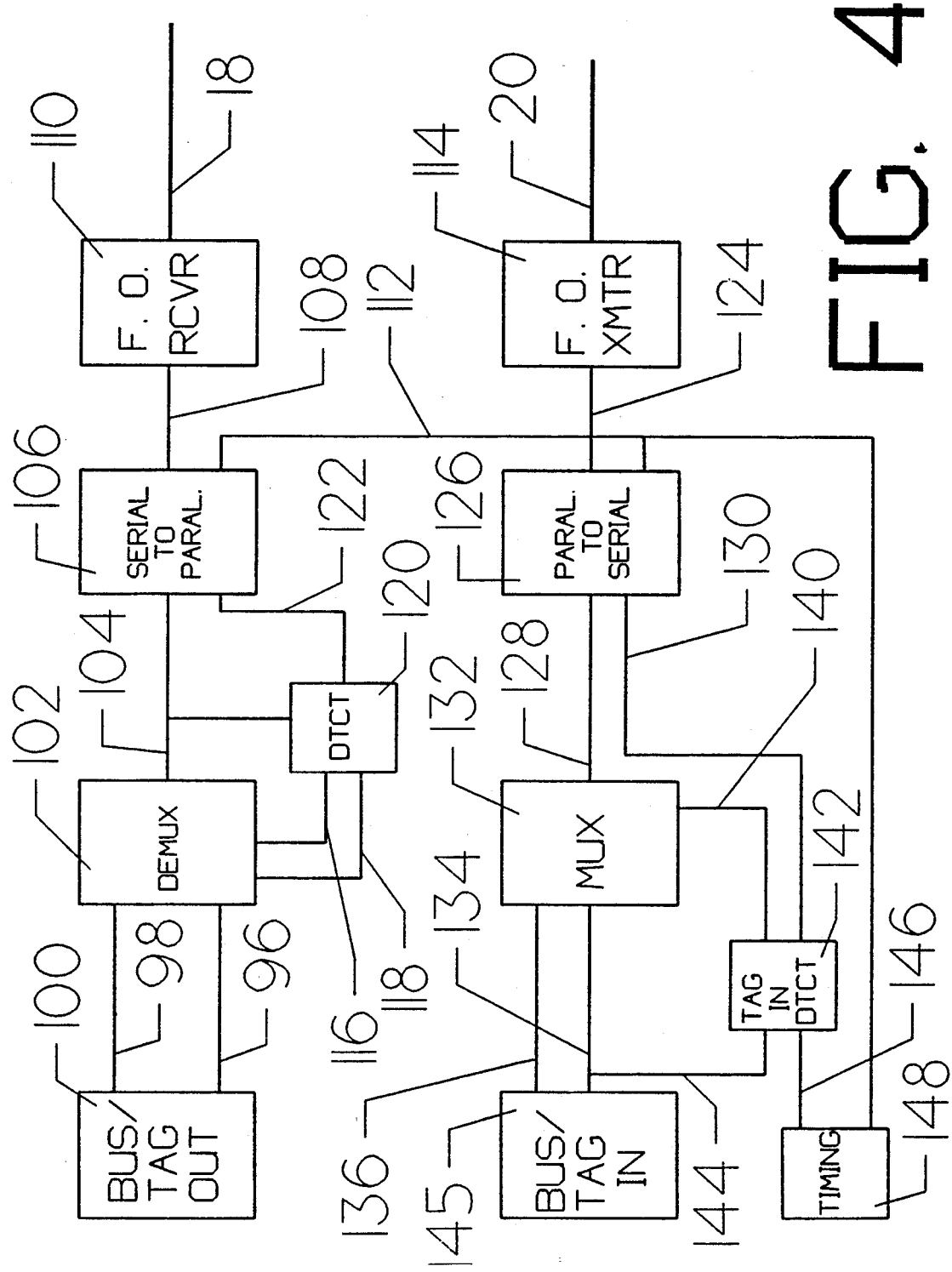
FIG. 4 is a detailed block diagram of the peripheral device interface.

FIG. 4 is a detailed block diagram of the functions of the peripheral device interface adapter. Data is received from the host computer BMC via fiber optic cable 18 which is coupled to fiber optic receiver 110. The modulated light beam is converted to an electrical digital data stream by fiber optic receiver 110. This digital data stream is transferred to serial to parallel converter 106 via line 108.

Under control of timing generator 148 via line 112 and detector 120 via line 122 serial to parallel converter 106 converts the electrical digital data stream received via line 108 into a nine bit parallel word, which is time division multiplexed into bus and tag components. This nine bit parallel word is transferred to demultiplexer 102 via signal lines 104. A nine bit parallel bus data word and a nine bit parallel tag word are transferred via signal lines 98 and 96 respectively, to bus/tag output connector. Demultiplexer 102 is controlled by detector 120 via lines 116 and 118 to separate bus and tag data. Bus/tag output adapter 100 contains the nineteen input/output drivers which convert the ten bus data bit positions and the nine tag control bit positions into the electrical levels associated with the BMC port of the peripheral device.

Data to be transmitted from the peripheral device to the host computer BMC is received by bus/tag input connector 145 wherein the nine bit parallel bus data word and the nine bit parallel tag in control word have the BMC standard input/output levels converted to internal logic levels. The converted nine bit bus data word is transferred to multiplexer 132 via signal lines 136, and the nine bit tag control word is transferred to multiplexer 132 via cable 134. The tag in signals are received by tag detector 142 via line 144, which along with the clock signal from timing generator 148, controls multiplexer 132 via line 140 and parallel to serial converter 126 via line 130.

Multiplexer 132 time division multiplexes the nine bit parallel bus data word and the nine bit parallel tag control word to produce a single nine bit word which is transferred to parallel to serial converter 126 via cable 128. This nine bit word is converted into a serial bit stream by parallel to serial converter 126. The serial bit stream is transferred via line 124 to fiber optic transmitter 114, which modulates a light beam. This modulated light beam is coupled to fiber optic cable 20 for transfer to the host computer BMC.

Figure 5:
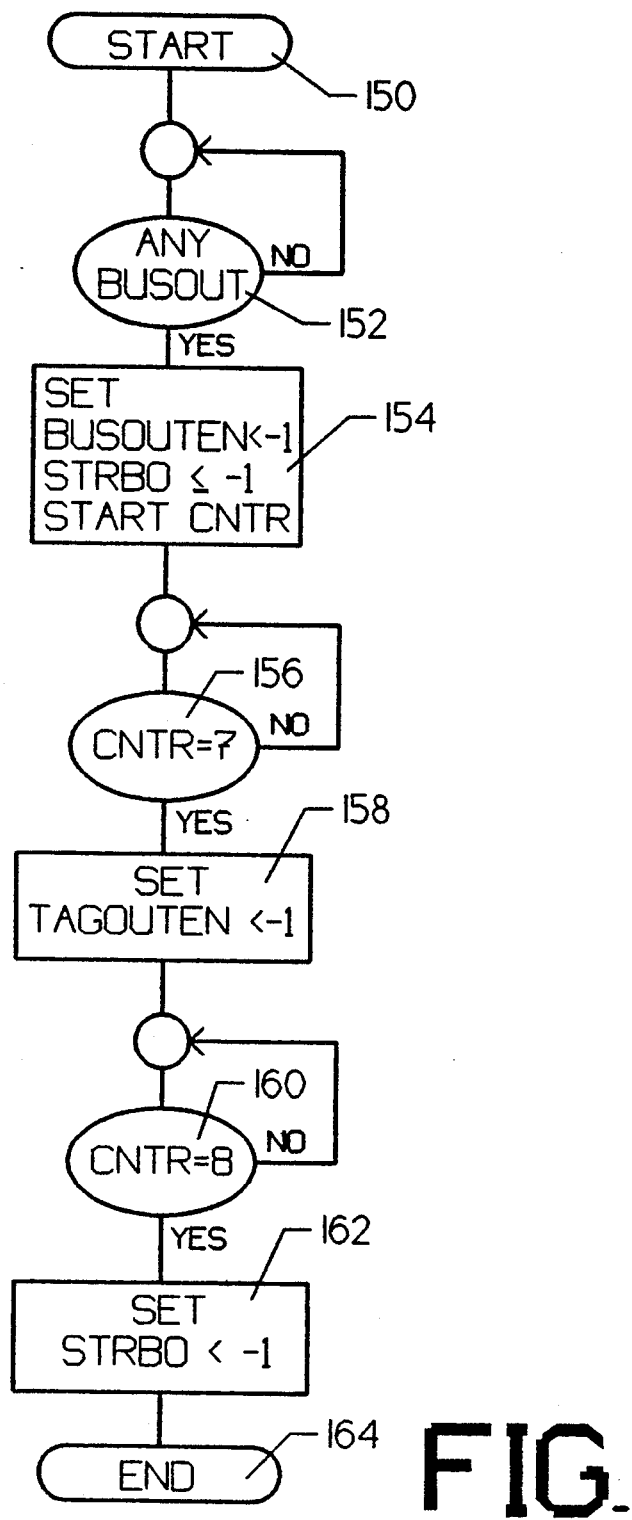
FIG. 5 is a flow chart of the transmission data processing.

FIG. 5 is a flow chart showing the operation of the host computer BMC output functions. The process begins at element 150. Element 152 awaits output activity. Normally this output activity is requested by software which causes the associated hardware functions to be initiated.

As soon as output activity is initiated, element 154 sets the busout and strobe0 counters and begins to count the transferred bits. The count is maintained by element 156 until all bus bits have been serialized and transferred. Control is then given to element 158 which sets up to tag counter. Element 160 continues the transfer until all tag bits have been serialized and transferred. After all bus and tag bits have been transferred, element 162 resets strobe0 and exit is accomplished via element 164.

Figure 6:
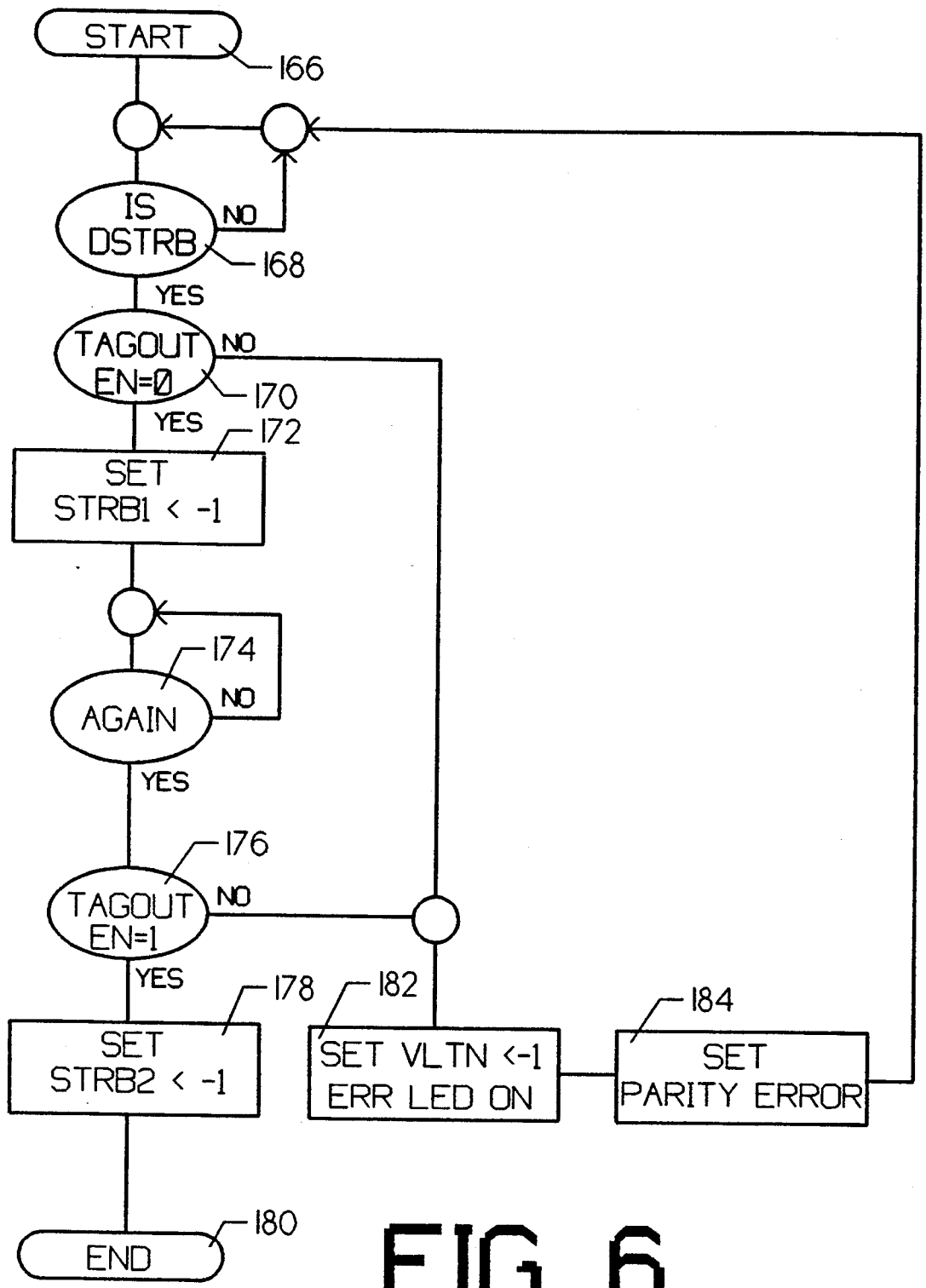
FIG. 6 is a flow chart of the reception data processing.

FIG. 6 is a flow chart of data reception by the interface adapter in accordance with the preferred mode of the present invention. Entry is via element 166. Element 168 forces a wait condition until the reception is initiated.

After initiation of reception, element 170 ensures that the tag or control information is received first. If not, an error has occurred. Element 182 sets the internal error condition and notifies the operator by energizing an error indicating LED. Element 184 sets the parity error and returns control to await initiation of another reception sequence.

The first data received is always bus out information, element 172 sets up the bus out mode and initiates the counter. Element 174 counts the nine bus out bits into the receiving interface. The completion of the bus out sequence is determined by element 176. If the bus out sequence has been successful, element 178 sets up the tag out reception mode. Exit is via element 180.

Figure 7:
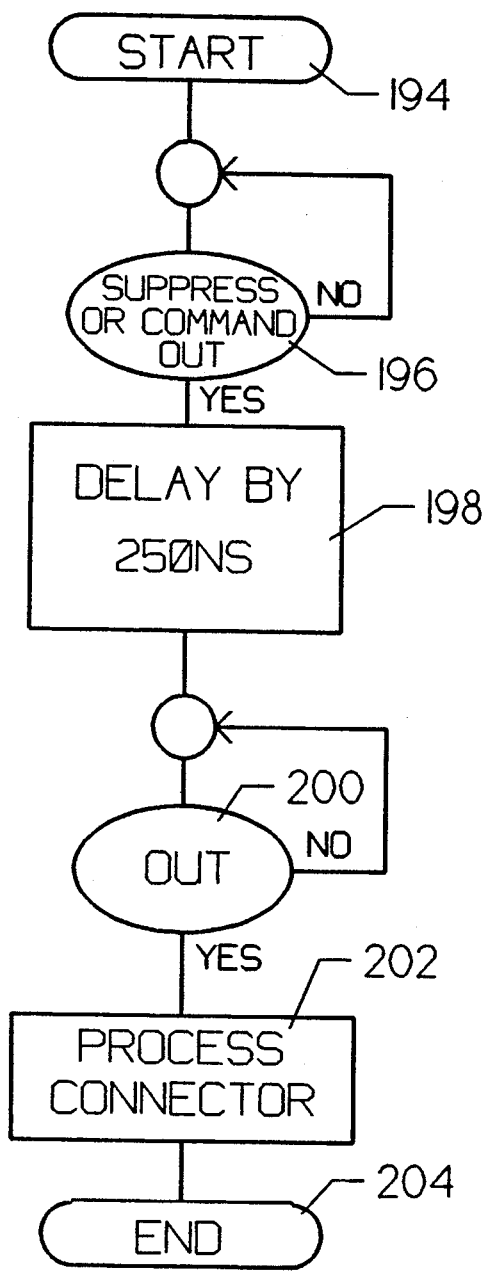
FIG. 7 is a flow chart of the suppression delay.

FIG. 7 is a flow chart showing the operation of the delayed suppress output. Entry is via element 194. The process is delayed by element 196 until a suppress or output command is present. The 250 nanosecond delay is provided by element 198. This permits the system to receive all serial bytes in the fiber optic cable.

Element 200 awaits the initiation of the output mode. After it begins, element 202 provides the process connector. Exit is via element 204.

Figure 8:
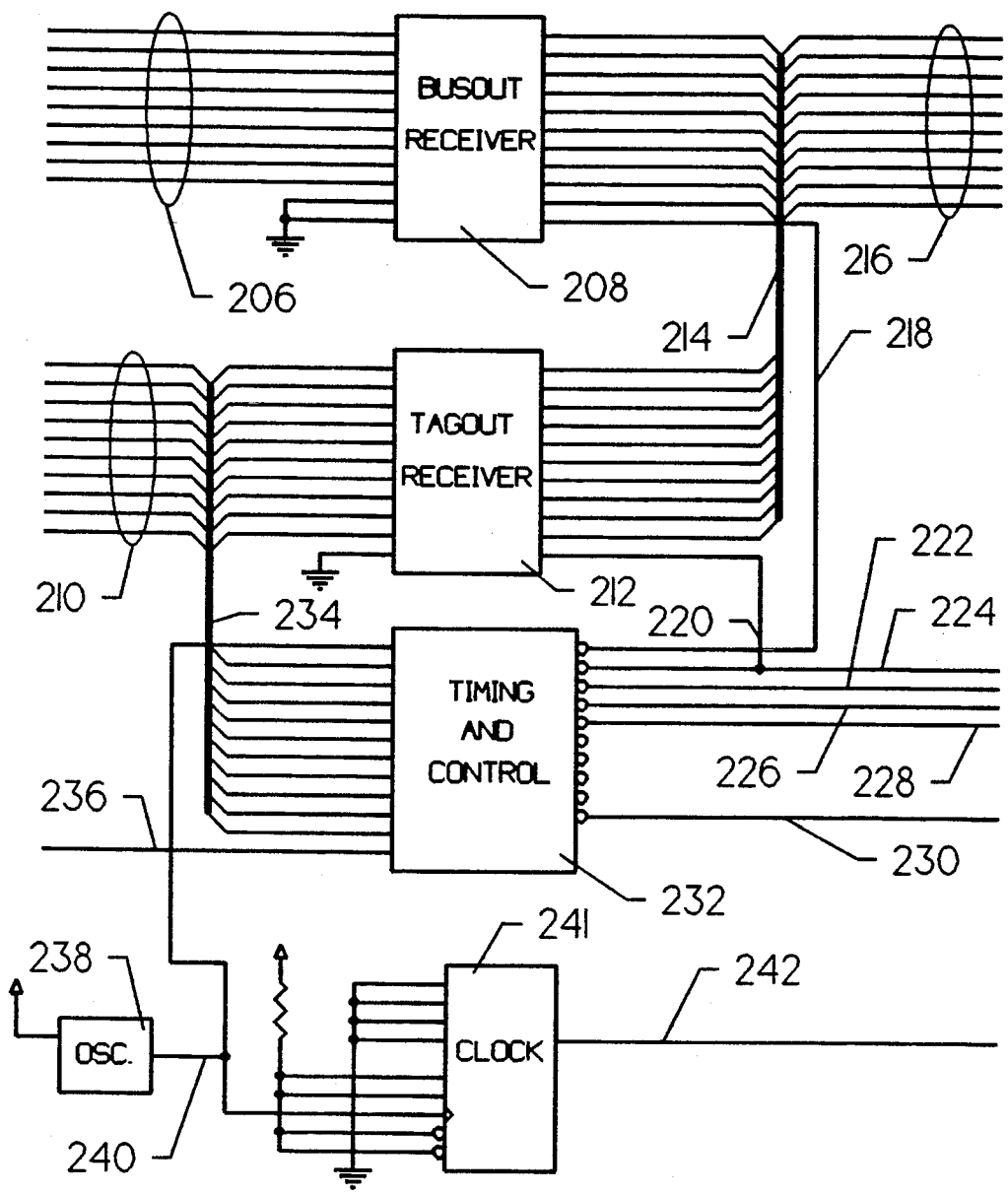
FIG. 8 is a schematic diagram of the host computer transmit interface circuitry.

FIG. 8 is a detailed schematic diagram of the circuitry associated with host computer BMC output level conversion and multiplexing. Interface signals 206 contain the output lines associated with the eight parallel bus bit positions and the parity bit. Interface signals 206 couple directly to the bus out connector of the host computer BMC for the BMC channel to be converted. Bus out receiver 208, comprising a 74F827 semiconductor package, contains ten (only nine are used) separate BMC compatible receiver circuits. Each of these circuits is simultaneously enabled by a bus out enable signal generated by timing and control circuit 232 and placed on line 218.

Tag out receiver 212 (also a 74F827 semiconductor package) similarly contains ten BMC receiver circuits for the level conversion of the ten bit positions of the tag output cable. The output of tag out receiver 212 is enable by a tag out enable signal place on line 220 by timing and control circuit 232.

Signal lines 216, containing ten bit positions, is the wire-ored output 214 of bus out receiver 208 (only nine active bit positions) and tag out receiver 212 (all ten bit positions active). Because timing and control circuit 232 alternately enables bus out receiver 208 via line 218 and tag out receiver 212 via line 220, the result is that cable 216 contains the time multiplexed output of the bus and tag data.

Oscillator 238 is the 83.36 MHz time standard for the host computer BMC interface adapter. The basic timing signal is provided to timing and control circuit 232 and clock circuit 241 via line 240. Clock circuit 241 comprises a 74F161 semiconductor package strapped to provide the 10.42 MHz clock signal on line 242 by dividing by eight.

Timing and control circuit 232 is a 22V10 (7 ns) semiconductor package which sequences the operation of both output and input functions. It receives all tag output data via signal lines 234. Line 236 provides the data strobe signal from serial to parallel converter 268 (see also FIG. 10), which is the control standard for data received by the host computer BMC from the peripheral device.

Figure 10:
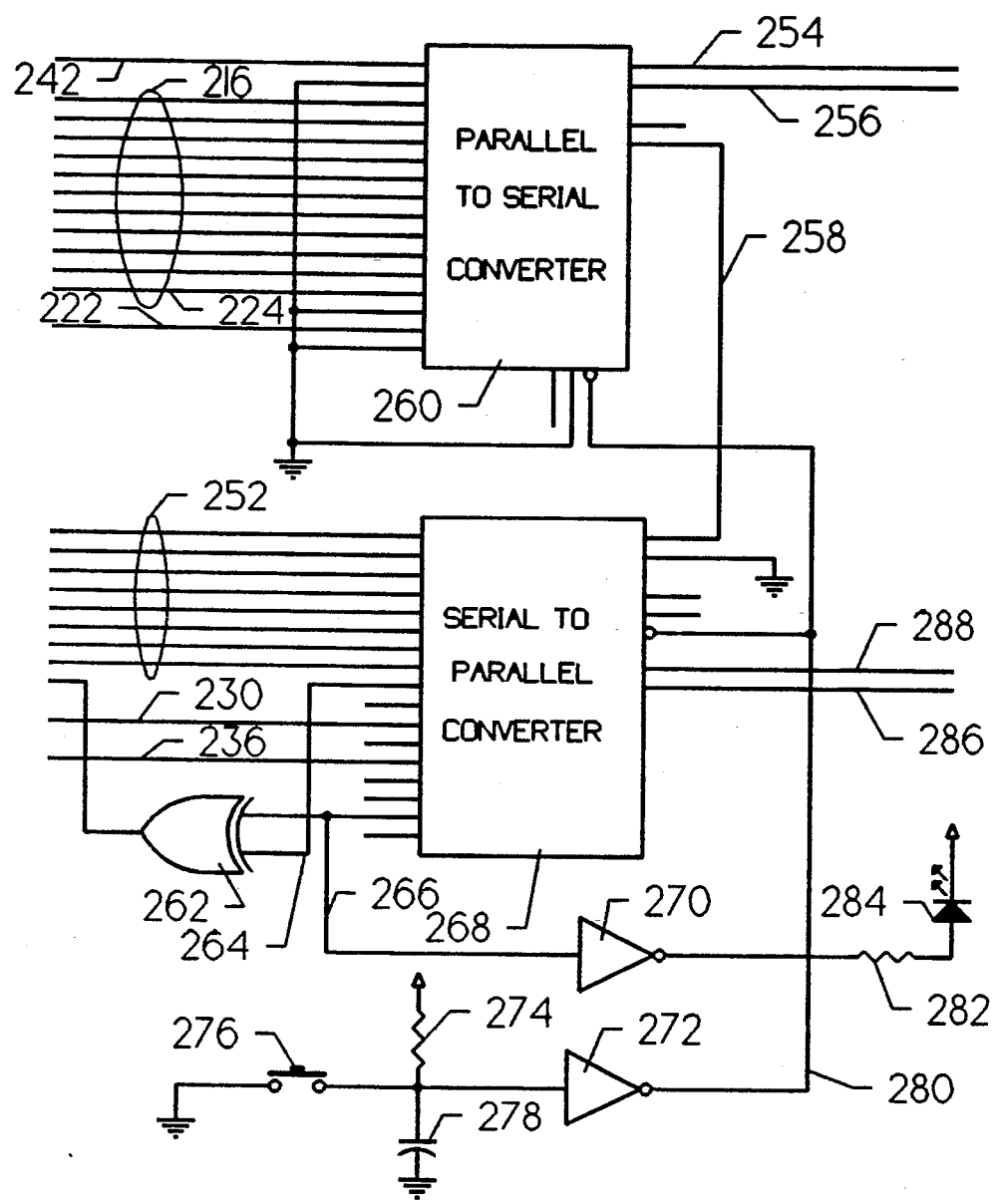
FIG. 10 is a schematic diagram of the host computer multiplexer/demultiplexer circuitry.

In addition to providing the tag out enable signal to tag out receiver 212 via line 220, timing and control circuit 232 also provides the signal via line 224 to parallel to serial converter 260 (see also FIG. 10). The tag out enable signal indicates when tag data is being transferred during output, thus defining the number of bit positions to be serialized. Output is also controlled by the strobe0 signal placed on line 222 for parallel to serial converter 260. This signal permits parallel to serial converter 260 to move to the next sequential bit position.

Timing and control circuit 232 also controls the host computer BMC interface adapter input functions. Control signal strobe1, placed on line 226, defines the ten bit parallel word received by bus in driver 248 via signal lines 252 (see FIG. 9) as bus data. Similarly, the strobe2 signal, when placed on line 228, instructs tag in driver 250 that the data on signal lines 252 is tag information. The tag in enable signal placed on line 230 switches serial to parallel converter 268 (see also FIG. 10) to tag mode.

Figure 9:
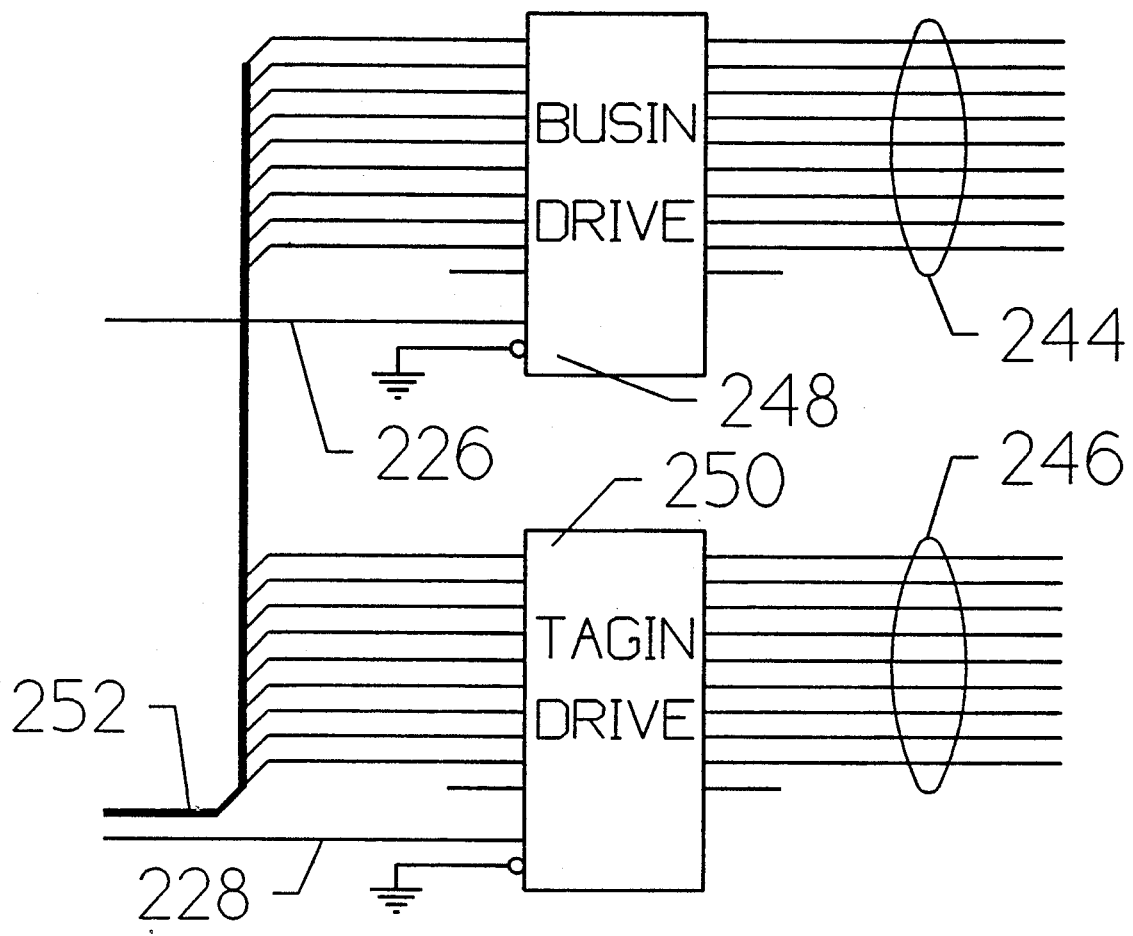
FIG. 9 is a schematic diagram of the host computer reception interface circuitry.

FIG. 9 is a detailed schematic diagram of the host computer BMC input drivers. The input data is received as a nine bit parallel word on signal lines 252 from serial to parallel converter 268 (see also FIG. 10). Bus in driver 248 and tag in driver 250, each comprising a 74F841 semiconductor package, are alternately enabled by the strobe1 signal on line 226 and the strobe2 signal on line 228, respectively. Bus in driver 248 contains nine BMC compatible driver circuits. The nine output lines comprise signal lines 244 which are directly coupled to the host computer BMC bus in connector for the associated BMC input channel. Similarly, tag in driver 250 converts the signal levels of the nine tag bit positions such that signal lines 246 may be directly coupled to the BMC tag in connector for the associated BMC input channel.

FIG. 10 is a detailed schematic diagram of the serial to parallel and parallel to serial converters of the host computer interface adapter. The ten bit positions of the time multiplexed output data is received via signal lines 216 (see also FIG. 8) and provided to parallel to serial converter 260, comprising an AM7968 semiconductor package. The conversion is clocked by line 242 containing the 10.42 MHz clock signal. The strobe0 signal on line 222 sequences the converter between bit positions. The tag out enable signal available on line 224 signifies whether the conversion is of bus or tag data. The data output of parallel to serial converter 260 is a balanced serial bit stream present between lines 254 and 256. Line 258 couples the 10.42 MHz clock signal to serial to parallel converter 268.

For data received by the host computer BMC as a balanced serial bit stream between lines 286 and 288, serial to parallel converter 268 produces a nine bit parallel data word on signal lines 252, which is the time multiplexed tag and bus information. Line 230 transfers the tag in enable signal to signify tag mode. The data strobe signal is extracted from the incoming data stream and provided via line 236 to timing and control circuit 232 (see also FIG. 8).

Data synchronization errors detected by serial to parallel converter 268 result in an error signal on line 266 (see also FIG. 6). This signal is amplified by LED driver 270 and illuminates LED 284 via series current resistor 282 to notify the operator of a data synchronization error. The error signal is also used in conjunction with exclusive-or 262 to generate a parity error for the data on signal lines 216 to notify the host computer BMC of the error. Because the fiber optic transmission and the interface adapter circuitry of the present invention are transparent to the host computer, the data synchronization error will appear as a simple parity error on the bus cable when generated by exclusive-or 262. The host computer BMC software will then initiate whatever error recovery capability presently exists for the BMC interface.

Single pole/single throw push button 276 permits the operator to manually reset the interface adapter circuitry. Debounce is provided by the timing circuit of resistor 274 and capacitor 278. The debounced reset signal is buffered by driver 272 and transferred to serial to parallel converter 268 and parallel to serial converter 260 via line 280.

Figure 11:
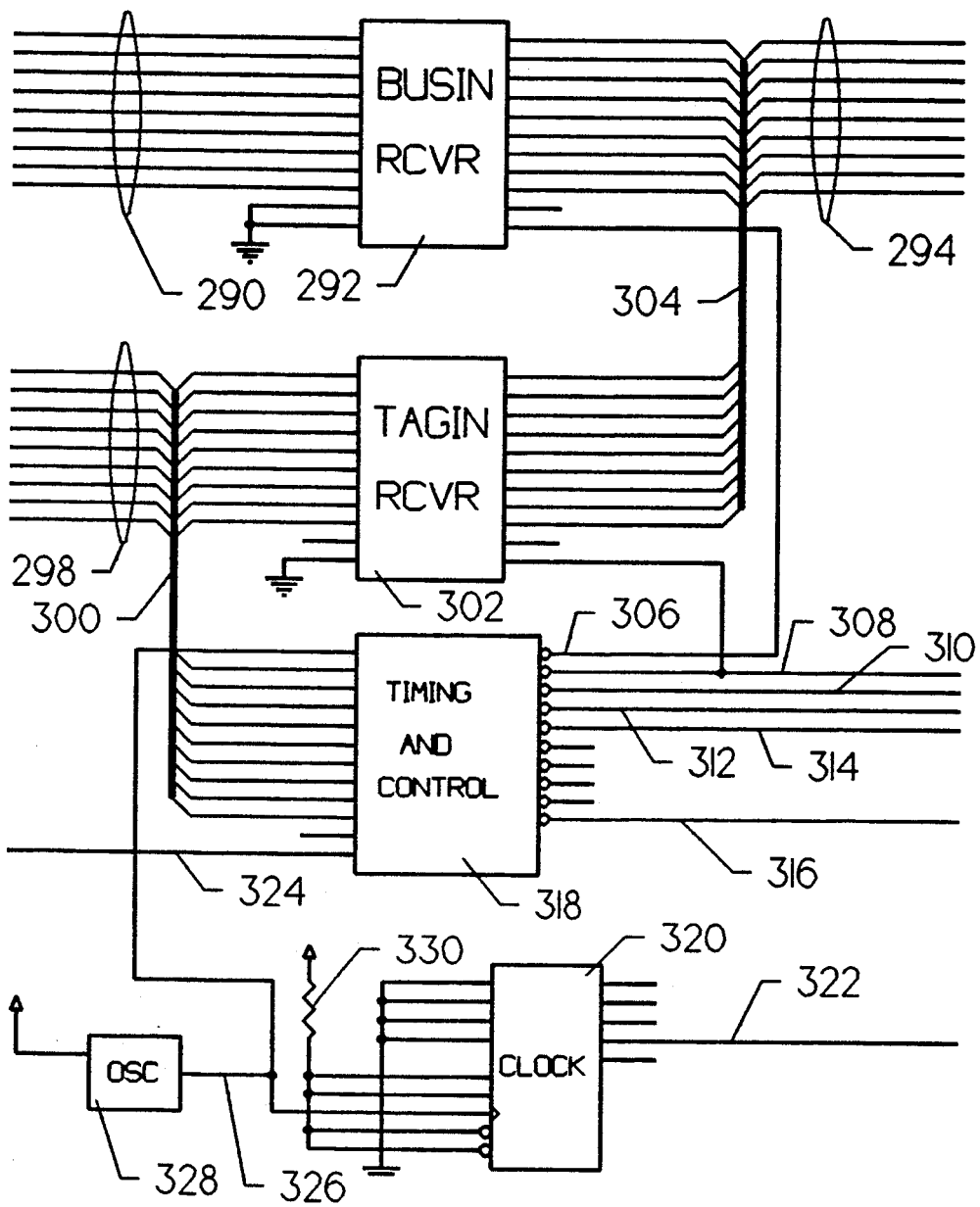
FIG. 11 is a schematic diagram of the peripheral device transmit interface circuitry.

FIG. 11 is a detailed schematic diagram of the peripheral device interface adapter circuitry for transferring data from the peripheral device to the host computer. In accordance with standard usage, this is termed input as it is input to the host computer BMC. The data is generated within the peripheral device and presented to the BMC connectors. Signal lines 290 are coupled directly to the bus connector and signal lines 298 are coupled to the tag connector.

Bus in receiver 292 and tag in receiver 302 are each a 74F827 semiconductor package containing ten individual BMC compatible line receivers. The outputs of each are wire-ored at 304 as shown to produce the nine bit parallel word placed on signal lines 294. Bus in receiver 292 and tag in receiver 302 are alternately enabled by lines 306 and 308 respectively to result in time division multiplexing of the bus and tag information on signal lines 294.

Oscillator 328 provides a 83.36 MHz output to timing and control circuit 318 and clock circuit 320 via line 326. Clock circuit 320, comprising a 74F161 semiconductor package, is strapped to provide a divide by eight or 10.42 MHz output on line 322. These two timing signals provide the basic synchronous timing control for the peripheral device interface adapter. Resistor 330 pulls up the unused inputs to clock circuit 320.

Timing and control circuit 318 receives all of the tag in information via signal lines 300. It also receives the 83.36 MHz output of oscillator 328 via line 326. A data strobe signal is received via line 324 from serial to parallel converter 348 (see also FIG. 13). This data strobe is derived from the incoming data stream with the exact timing defined by the internal PLL clock of serial to parallel converter 348 (see also FIG. 13).

A 22V10 (7 ns) semiconductor package comprises timing and control circuit 318. The output signals produced include the bus in enable on line 306 and the tag in enable on line 308. As explained above, these signals alternately enable the bus and tag signals to be enabled to signal lines 294. The strobe0 signal, placed on line 310, permits parallel to serial converter 342 (see also FIG. 13) to initiate the serialization process of the input bits. The strobe1 and strobe2 signals, placed on lines 312 and 314 respectively, alternately enable bus out driver 336 and tag out driver 338 (see also FIG. 12). Line 316 provides the tag out enable signal to timing and control 318 (see also FIG. 13) to sequence it between bus out and tag out.

Figure 12:
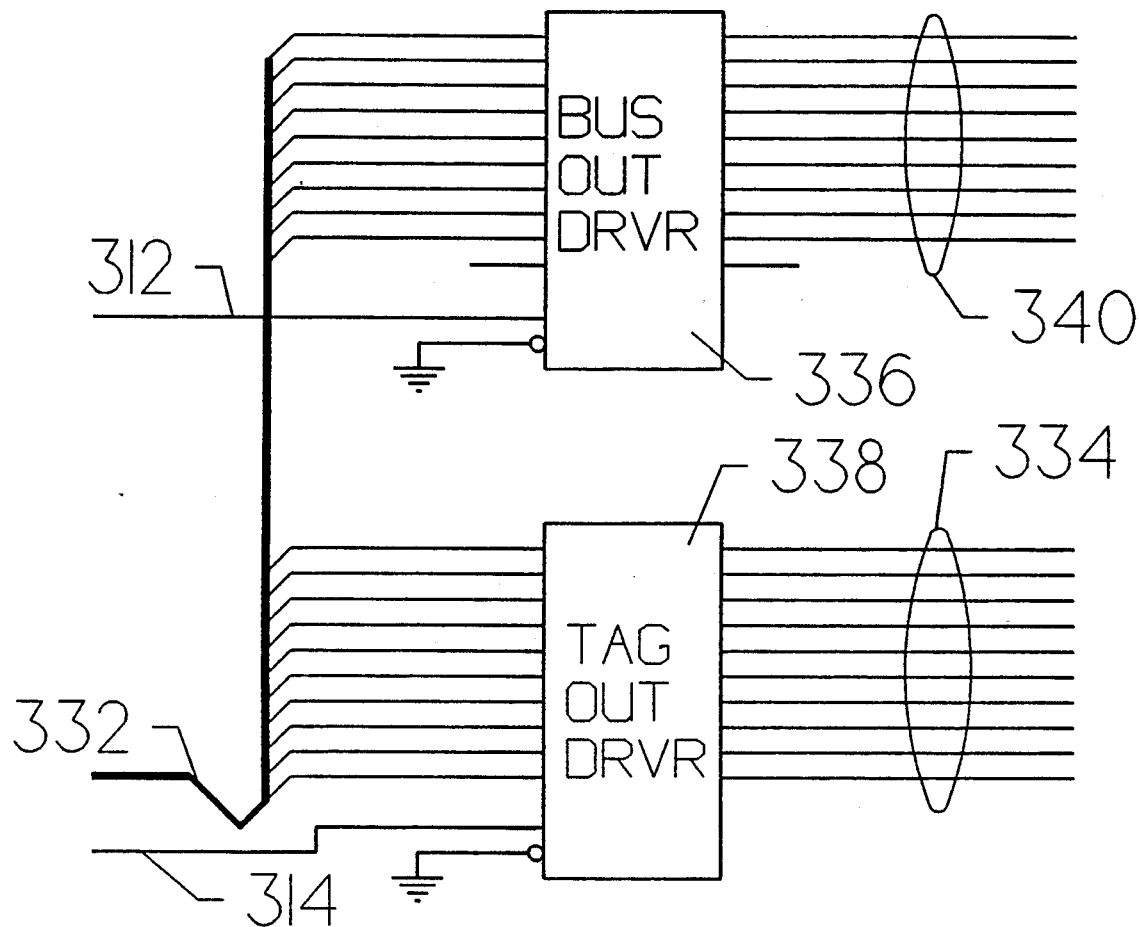
FIG. 12 is a schematic diagram of the peripheral device reception circuitry.

FIG. 12 is a detailed schematic diagram showing the peripheral device output (i.e. receiving) circuitry. The output data (i.e. data received by the peripheral device) is placed on signal lines 332 (see also FIG. 13). Bus output driver 336 and tag output driver 338 are each a 74F841 semiconductor package containing ten (only nine used by bus output driver 336) individual BMC compatible output line drivers. The output of bus output driver 336 on signal lines 340 is coupled to the bus out BMC connector of the peripheral device. Similarly, signal lines 334, the output of tag output driver 338, is coupled directly to the tag out BMC connector of the peripheral device.

Bus output latch 336 is clocked by the strobe1 signal received from timing and control circuit 318 via line 312. Similarly, tag output latch 338 is clocked by the strobe2 signal on line 314.

Figure 13:
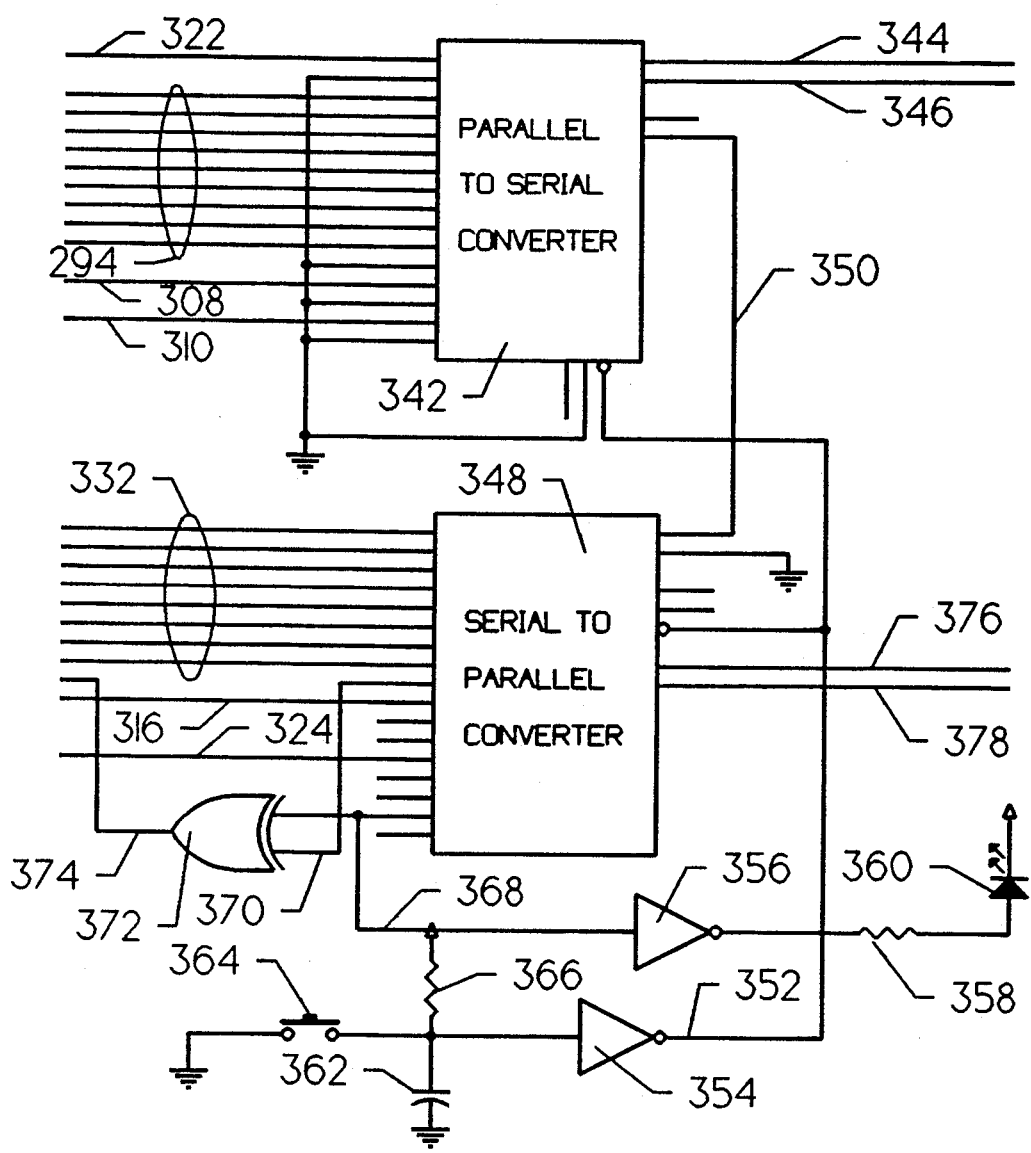
FIG. 13 is a schematic diagram of the peripheral device multiplexer/demultiplexer circuitry.

FIG. 13 is a schematic diagram of the serial to parallel and parallel to serial conversion circuitry of the peripheral device interface adapter. For input (i.e. data transferred from the peripheral device to the host computer BMC), the nine bit parallel word representing the time division multiplexed addition of the bus and tag information is presented to parallel to serial converter 342 by signal lines 294. The 10.42 MHz clock signal is available on line 322. The tag in enable signal and strobe0 signal are transferred from timing and control circuit 318 by lines 308 and 310, respectively. The tag in enable signal indicates when the interface adapter is in the tag rather than the bus mode. The clock signal provides basic timing. The strobe0 signal causes sequential shift between bit positions. Parallel to serial converter 342 is an AM7968 semiconductor package. The output of parallel to serial converter 342 is a balanced bit stream between lines 344 and 346. Line 350 merely couples the clock signal to serial to parallel converter 348.

Output data (i.e. data transmitted by the host computer) is received as a balanced bit stream between lines 376 and 378. Serial to parallel converter 348 converts this bit stream into a nine bit parallel word having the eight lower order bits transferred via signal lines 332. The parity bit is coupled by line 370 to exclusive-or 372. The second input to exclusive-or 372 is line 368 which is set to indicate a synchronization error in the serial to parallel conversion process. In addition to illuminating LED alarm 360 via driver 356 and current limiting resistor 358, the error signal causes exclusive-or 372 to create a parity error via line 374, which is treated by the peripheral device as the BMC interface parity bit. Thus the operator is notified of the error via LED 360 and the peripheral device is notified via incorrect parity.

The tag out enable signal received via line 316 is used to indicate when the interface adapter is in the tag rather than bus mode. Line 324 transfers the data strobe signal to timing and control circuit 318 (see also FIG. 11). This signal is derived from the incoming data stream.

Push button 364 is a single pole/single throw momentary contact switch. It is utilized by the operator to manually reset the logical condition of the peripheral device interface adapter. The manual reset signal is debounced by resistor 366 and capacitor 362. Driver 354 buffers the debounced reset signal and provides it to parallel to serial converter 342 and serial to parallel converter 348 via line 352.

Figure 14:
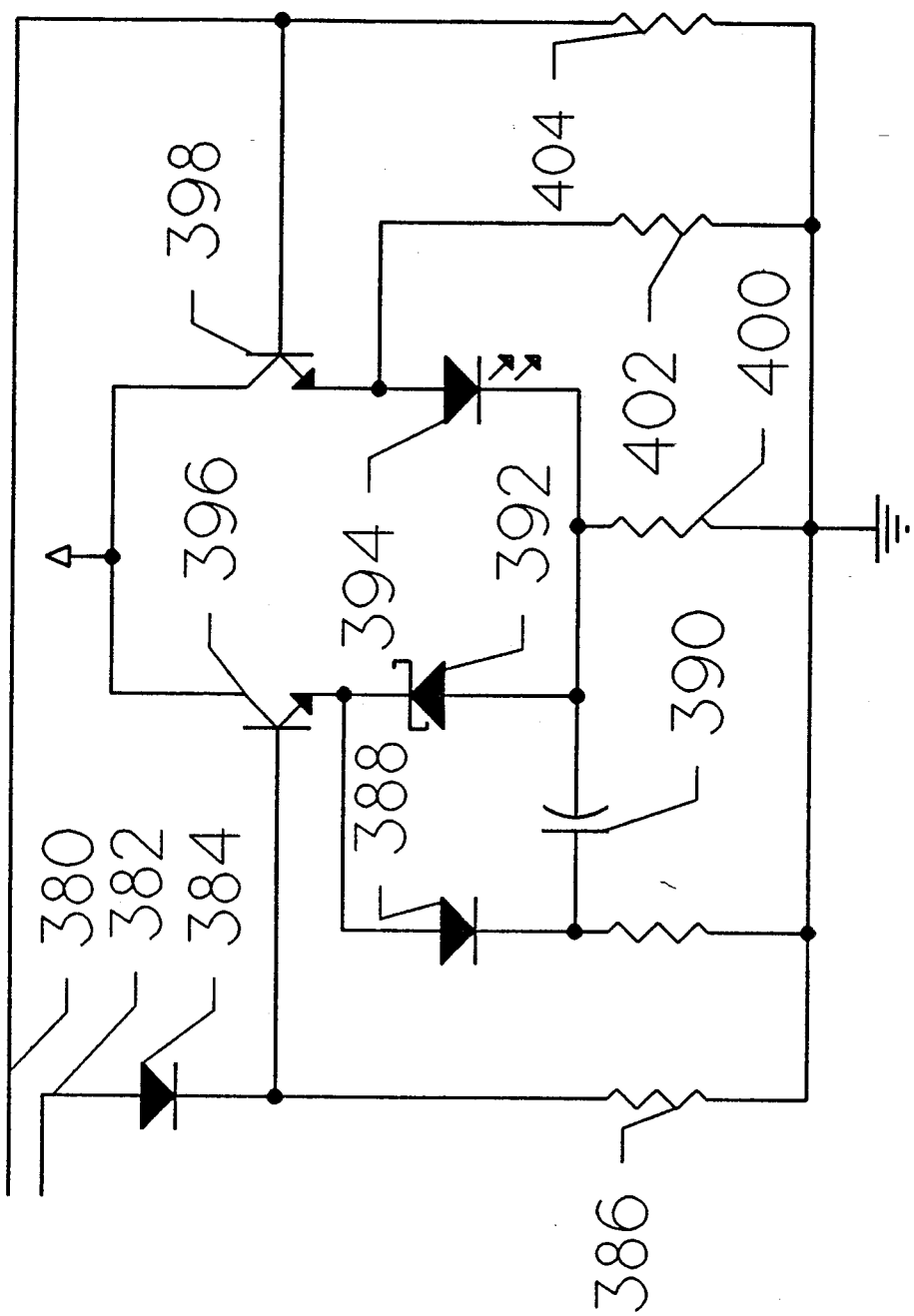
FIG. 14 is a schematic diagram of the circuity for conversion of the electrical serial data stream into a light serial data stream.

FIG. 14 is a detailed schematic diagram of the fiber optic transmitter which converts the balanced serial bit stream into a modulated beam of coherent light. The identical circuit is employed by both the host computer BMC and peripheral device BMC interface adapter. For the host computer BMC, lines 380 and 382 are coupled to lines 254 and 256, respectively (see also FIG. 10). For the peripheral device, lines 380 and 382 are coupled to lines 344 and 346, respectively (see also FIG. 13).

A positive five volts is applied to the collectors of drive transistors 396 and 398, which are type MRF581A. The bases of these transistors are controlled by the opposite polarities of the balanced serial bit stream imposed on lines 380 and 382 as dropped across 215 ohm load resistors 404 and 386, respectively. Diode 384 (type 1N4150) provides reverse current protection. The emitter collector current of transistor 398 drives the type HFBR-1402 light emitting diode 394 to produce the modulated light beam, with 31.6 kohm resistor 402 limiting the total current.

The emitter of drive transistor 398 is biased above ground by 51.1 kohm resistor 402. Drive transistor 396 is similarly biased by a 41.2 kohm resistor with type 1N4150 diode 388 providing reverse current protection for the collector emitter circuit. Pulse shaping is provided by zener diode 392 (type 5082-2810) and 100 pfd capacitor 390.

Light emitting diode 394 is optically coupled to fiber optic cable 18 for the host computer BMC interface adapter. In the peripheral device interface adapter, light emitting diode 394 is optically coupled to fiber optic cable 20.

Figure 15:
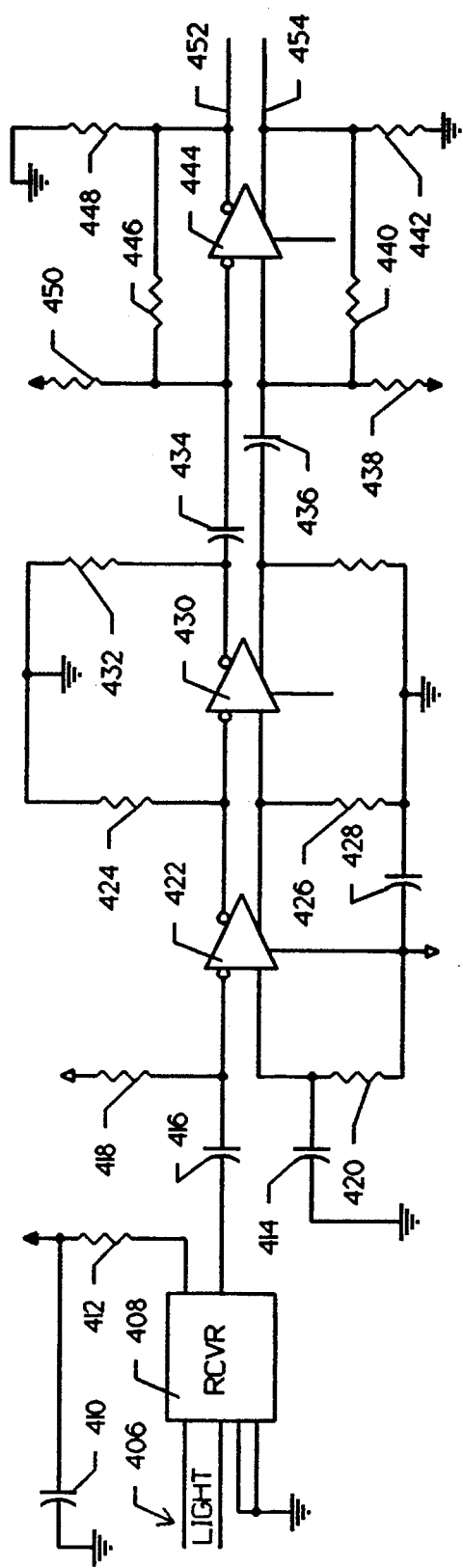
FIG. 15 is a schematic diagram of the circuity for conversion of the light serial data stream into an electrical serial data stream.

FIG. 15 is a detailed schematic diagram of the fiber optic receiver. As with the fiber optic transmitter circuit, the fiber optic receiver circuit is identical for both the host computer and peripheral device interface adapters. Light connector 406 is coupled to fiber optic cable 20 for the host computer BMC interface adapter and to fiber optic cable 18 for the peripheral device interface adapter. Conversion from a light beam to an electrical signal is accomplished by type HFBR-2402 light receiver 408. The remaining circuitry amplifies and processes the converted electrical signal.

The receiver enable input of light receiver 408 is pulled up by 10 ohm resistor to the positive five volt supply with capacitor 410 decoupling parasitics. The converted electrical signal is amplified by three stages of operational amplification by amplifiers 422, 430, and 444 (all type MC10116). Interstage coupling is provided by 0.1 mfd capacitor 416 and 100 pfd capacitors 434 and 436. The unbalanced input to the first stage and balanced inputs to the third stage are biased by 1 kohm resistors 418, 450, and 438. The positive and negative sides of the balanced outputs of each stage are biased by 510 ohm resistors 424, 432, 448, 426, and 442. The first stage has feed back supplied by 0.01 mfd capacitor 428 and 1 kohm resistor 420 as decoupled by 0.1 mfd capacitor 414. Feed back at stage three is accomplished by 1 kohm resistors 440 and 446.

The output of operational amplifier 444 is the balanced serial bit stream which is processed by the standard digital circuitry of the host computer and peripheral device interface adapters. For the host computer, lines 452 and 454 couple directly to lines 288 and 286, respectively (see also FIG. 10). Similarly, lines 452 and 454 couple directly to lines 376 and 378 for the peripheral device interface adapter (see also FIG. 13).

Figure 16:
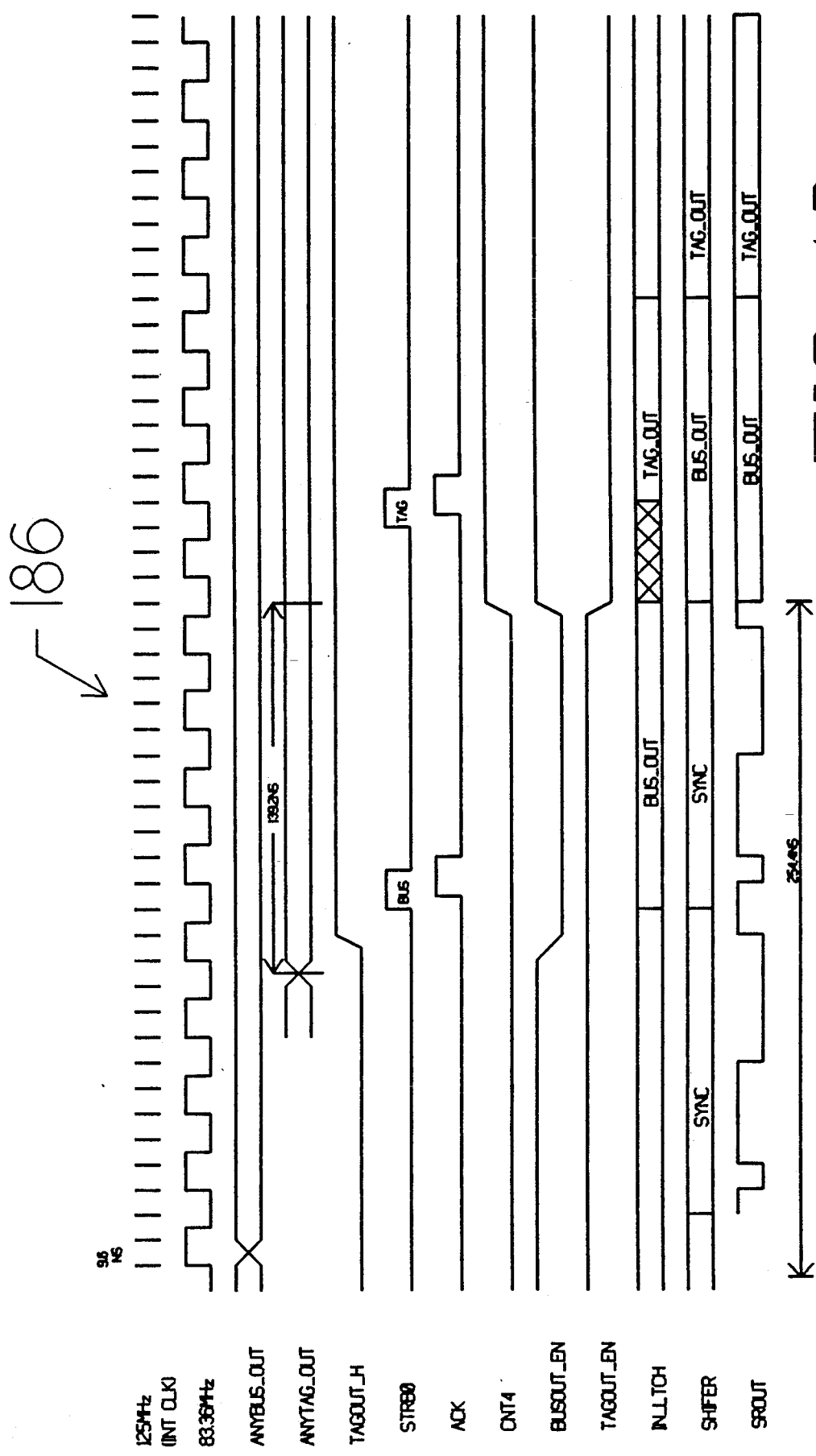
FIG. 16 is a timing diagram for the signals associated with transmission of data from the host computer.

FIG. 16 is timing diagram 186 of the key signals within the host computer interface adapter for data output (i.e. data transfer from host computer BMC to peripheral device BMC). The 125 MHz internal (i.e. host computer BMC) clock is shown for reference. The 83.36 MHz signal is produced by oscillator 238 on line 240 (see also FIG. 8). The ANYBUS_OUT and ANYTAG_OUT timing corresponds to the individual bit positions of signal lines 206 and 210, respectively.

The TAGOUT_H is the control line produced by the host computer BMC timing and control 232 (see also FIG. 8) to specify valid bus out data on signal lines 206. The ACK and CNT4 are also BMC related control signals. The STRB0 signal is produced by timing and control circuit 232 and placed on line 222 (see also FIG. 8). The BUSOUT_EN and TAGOUT_EN signals are also produced by timing and control circuit 232 and placed on lines 220 and 230, respectively. The IN_LTCH, SHIFER, and SROUT timing represents to various timing functions as they occur within the host computer BMC adapter parallel to serial converter 260 (see also FIG. 10).

Figure 17:
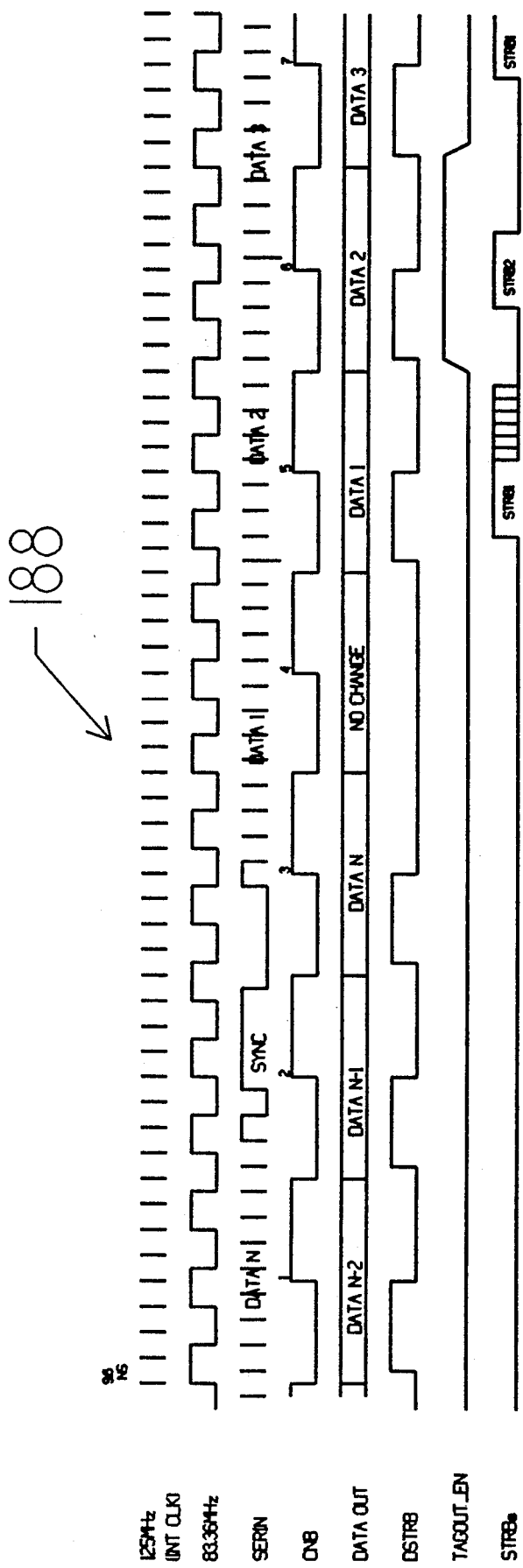
FIG. 17 is a timing diagram for the signals associated with reception of data by the peripheral device.

FIG. 17 shows the timing 188 of the data output function (see also FIG. 16) within the peripheral device interface adapter. The data input is seen as SERIN. The TAGOUT_EN signal is produced by timing and control 318 and placed on line 316 (see also FIG. 11). The two output strobe signals, strobe1 and strobe2, are similarly produced by timing and control 318 and placed on lines 312 and 314, respectively. DSTRB, or the data strobe, signal is found on line 324.

Figure 18:
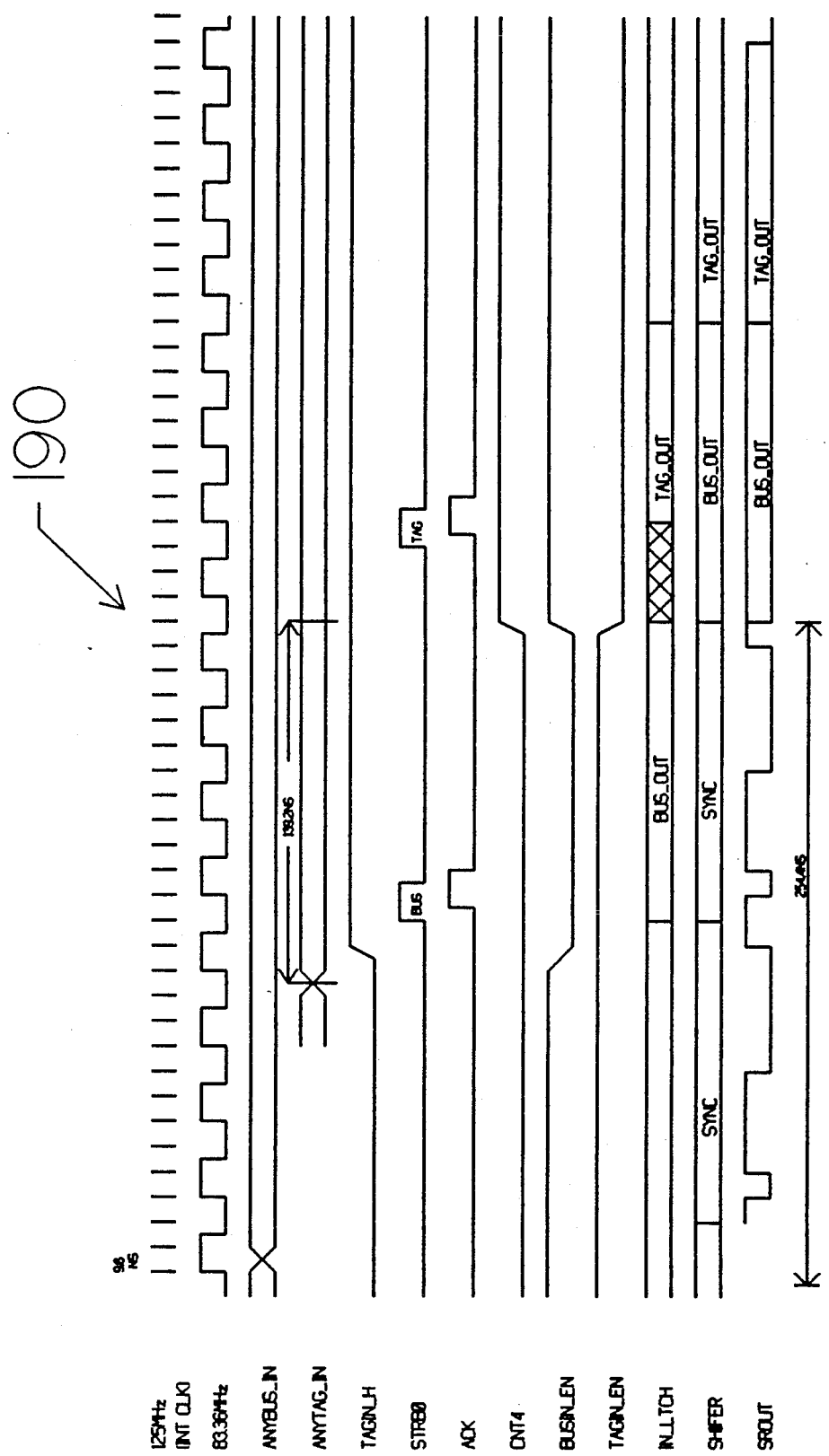
FIG. 18 is a timing diagram for transmission of data from the peripheral device.

FIG. 18 is a timing diagram 190 of input data as transmitted from the peripheral device interface adapter. The operation and control signals are analogous to the host computer BMC adapter operation for output data (see also FIG. 16).

Figure 19:
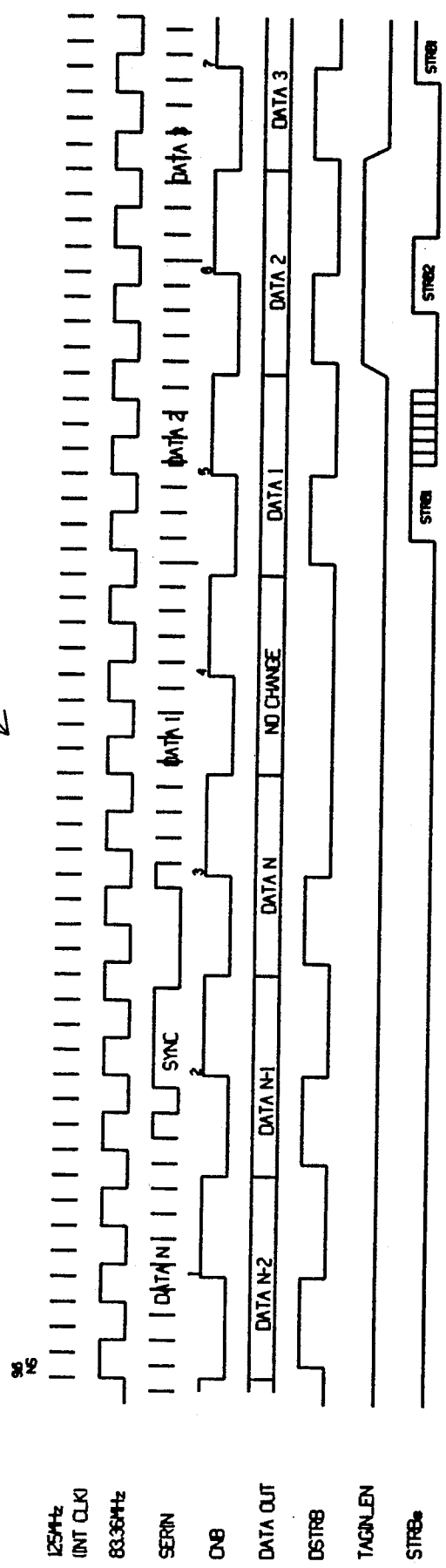
FIG. 19 is a timing diagram for reception of data by the host computer.

FIG. 19 is a timing diagram 192 of input data as received by the host computer interface adapter. The operation and control signals are analogous to the peripheral device operation for input data (see also FIG. 17).

Having thus described the preferred embodiments of the present invention, those of skill in the art will readily appreciate the other useful embodiments within the scope of the claims hereto attached.

I claim:

1. In a data processing system having a host computer with a block multiplexer channel and having a peripheral device having a block multiplexer channel, the improvement comprising:
   a. a first interface adapter coupled to said block multiplexer channel of said host computer for converting host computer data from said block multiplexer channel into an electrical serial stream of single bit data;
   b. an optical transmitter coupled to said first interface adapter for converting said electrical serial stream of single bit data to a first modulated beam of light and optically transmitting said first modulated beam of light;
   c. an optical receiver for optically receiving said first modulated beam of light and converting said first modulated beam of light into an electrical serial stream of single bit data;
   d. a second interface adapter coupled to said optical receiver and to said block multiplexer channel of said peripheral device for converting said electrical serial stream of single bit data into said host computer data; and
   e. a fiber optic cable coupled to said optical transmitter and to said optical receiver for transferring said first modulated beam of light from said optical transmitter to said optical receiver.

2. The improvement according to claim 1 wherein said second interface adapter includes means for converting peripheral device data from said block multiplexer channel into a second serial stream of single bit data and having a second optical transmitter for converting said second serial stream of single bit data into a second modulated beam of light and having a second optical receiver for converting said second modulated beam of light back into said second serial stream of single bit data and wherein said first interface adapter includes means for converting said second serial stream of single bit data into said host computer data, further comprising:
   a. a second fiber optic cable coupled to said second optical transmitter and said second optical receiver for transferring said second modulated beam of light from said second optical transmitter and said second optical receiver.

3. The improvement of claim 2 wherein said coupling between said host computer and said first interface adapter is compatible with said block multiplexer channel.

4. The improvement of claim 3 wherein said coupling between said peripheral device and said second interface adapter is compatible with said block multiplexer channel.

5. An apparatus for coupling a host computer having an electrical BMC input/output interface to a peripheral device having said electrical BMC input/output interface comprising:
   a. first converting means coupled to said host computer for converting said electrical BMC input/output interface to a first fiber optic interface employing a serial stream of single bit data;
   b. optically transmitting means coupled to said first fiber optic interface for optically transmitting said serial stream of single bit data;
   c. optically receiving means coupled to a second fiber optic interface for optically receiving said serial stream of single bit data;
   d. second converting means coupled to said peripheral device for converting said serial stream of single bit data into said electrical BMC input/output interface; and
   e. a fiber optic cable coupling said first fiber optic interface to said second fiber optic interface.

6. An apparatus according to claim 5 wherein said first converting means further comprises:
   a. changing means coupled to said host computer for changing electrical levels of data from said electrical BMC input/output interface into internal logic levels; and
   b. serializing means coupling to said changing means for serializing said internal logic levels into a single bit data stream.

7. An apparatus according to claim 5 or 6 wherein said second converting means further comprises:
   a. deserializing means coupled to said optical receiving means for deserializing said single bit data stream into a parallel word; and
   b. converting means coupled to said deserializing means and said electrical BMC input/output interface for converting said parallel word into levels compatible with said BMC input/output interface.

8. An apparatus according to claim 5 wherein said first transmitting means further comprises:
   a. means coupled to said serializing means for modulating a light beam with said single bit data stream; and
   b. means coupled to said modulating means for optically coupling said modulating means to said fiber optic cable; and
   c. means coupled to said coupling means for transmitting modulated signal down said first fiber optic cable.

9. An apparatus according to claim 5 or 6 wherein said second converting means further comprises:
   a. receiving means coupled to said first fiber optic cable for receiving said modulated light beam; and
   b. producing means coupled to said receiving means for producing a single bit data stream from said modulated light beam.

10. An apparatus for coupling a peripheral device having an electrical BMC input/output interface to a host computer having said electrical BMC input/output interface comprising:
    a. first converting means coupled to said peripheral device for converting said electrical BMC input/output interface to a first fiber optic interface employing a serial stream of single bit data;
    b. optically transmitting means coupled to said first fiber optic interface for optically transmitting said serial stream of single bit data;
    c. optically receiving means coupled to a second fiber optic interface for optically receiving said serial stream of single bit data;
    d. second converting means coupled to said host computer for converting said second fiber optic interface employing said serial stream of single bit data into said electrical BMC input/output interface; and
    e. a fiber optic cable coupling said first fiber optic interface to said second fiber optic interface.

11. An apparatus according to claim 10 wherein said first converting means further comprises:
    a. changing means coupled to said peripheral device for changing electrical levels of data from said electrical BMC input/output interface into internal logic levels; and
    b. serializing means coupling to said changing means for serializing said internal logic levels into a single bit data stream.

12. An apparatus according to claim 10 or 11 wherein said second converting means further comprises:
    a. deserializing means coupled to said optical receiver for deserializing said single bit data stream into a parallel word; and
    b. converting means coupled to said deserializing means and said electrical BMC input/output interface for converting said parallel word into levels compatible with said BMC input/output interface.

13. An apparatus according to claim 10 wherein said first transmitting means further comprises:
    a. modulating means coupled to said serializing means for modulating a light beam with said single bit data stream; and
    b. optically coupling means coupled to said modulating means for optically coupling said modulating means to said fiber optic cable; and
    c. transmitting means coupled to said optically coupling means for transmitting modulated signal down said first fiber optic cable.

14. An apparatus according to claim 10 or 11 wherein said second converting means further comprises:
    a. receiving means coupled to said first fiber optic cable for receiving said modulated light beam; and
    b. producing means coupled to said receiving means for producing a single bit data stream from said modulated light beam.

15. A method of transferring data from a single data processing device having a standardized electrical input/output interface to a second data processing device having said standardized electrical input/output interface comprising:
    a. directly converting electrical levels of signals at said standardized electrical input/output interface of said first data processing device into a modulated light beam;
    b. transferring said modulated light beam from said first data processing device to said second data processing device; and
    c. directly converting said modulated light beam into said standardized electrical input/output interface.

16. A method of transferring parallel data at a high rate from a first data processing device having a standardized electrical input/output interface to a second data processing device having said standardized electrical input/output interface comprising;

a. changing electrical levels of signals of said standardized electrical input/output interface of said first data processing device into internal logic levels;

b. converting said internal logic levels into a serial stream of single bit data having bus data bits and tag data bits;

c. waiting for an output activity flag from said first data processing device;

d. setting both a busout counter and a strobe0 counter to zero when said output activity flag is detected;

e. checking a TAGOUT enable signal at said second data processing device to ensure that said bus data bits are being transferred first;

f. setting error LED and parity error flag if said bus data bits are not being transferred first;

g. transferring said bus data bits from said first data processing device to said second processing device while maintaining a count of said transferred bus data bits with said busout counter until all said bus data bits have been transferred from the first data processing device to the second processing device;

h. transferring tag data bits from said first data processing device to said second processing device while maintaining a count of said transferred tag data bits with said strobe0 counter until all said tag data bits have been transferred from said first data processing device to said second data processing device;

i. resetting said strobe0 counter and said busout counter to zero in anticipation of a next transmission;

j. converting said serial stream of single bit data having said bus data bits and tag data bits into said internal logic levels; and k. changing the electrical levels of the internal logic levels into the standardized electrical input/output interface of said second data processing device.

17. An apparatus for coupling a host computer having a standardized electrical input/output interface to a peripheral device having said standardized electrical input/output interface comprising:

a. first converting means coupled to said host computer for converting said standardized electrical input/output interface to a first fiber optic interface employing a serial stream of single bit data;

b. optically transmitting means coupled to said first fiber optic interface for optically transmitting said serial stream of single bit data;

c. optically receiving means coupled to a second fiber optic interface for optically receiving said serial stream of single bit data;

d. second converting means coupled to said peripheral device for converting said serial stream of single bit data into said standardized electrical input/output interface; and e. a fiber optic cable coupling said first fiber optic interface to said second fiber optic interface.

* * * * *